Sept. 16, 1958   J. A. C. FOLLER ET AL   2,852,767
INFORMATION DISSEMINATION SYSTEM
Filed June 11, 1953   5 Sheets-Sheet 1

INVENTORS
J.A.C. FOLLER
JOHN E. FISHER
BY

Sept. 16, 1958 J. A. C. FOLLER ET AL 2,852,767
INFORMATION DISSEMINATION SYSTEM
Filed June 11, 1953 5 Sheets-Sheet 2

INVENTORS
J.A.C. FOLLER
JOHN E. FISHER
BY
Sidney W. Frick
Atty.

INVENTORS
J.A.C. FOLLER
JOHN E. FISHER

INVENTORS
J.A.C. FOLLER
JOHN E. FISHER

Sept. 16, 1958   J. A. C. FOLLER ET AL   2,852,767
INFORMATION DISSEMINATION SYSTEM Filed June 11, 1953   5 Sheets-Sheet 5

INVENTORS
J.A.C. FOLLER
JOHN E. FISHER
BY

2,852,767

INFORMATION DISSEMINATION SYSTEM

James A. C. Foller, Swarthmore, and John E. Fisher, Belfry, Pa.

Application June 11, 1953, Serial No. 360,942

9 Claims. (Cl. 340—225)

This invention relates to devices for the visual indication of information or intelligence and the remote control thereof by wire transmission of electrical impulses or by transmission of electromagnetic energy through the ether. It is particularly concerned with systems for the dissemination of the latest weather and other meteorological information in simplified form, and other information of general interest or of an advertising nature similar thereto in that it is capable of being broken up into a limited number of visual elements which can be selectively combined to provide adequate coverage of the subject.

The wide public interest in present and expected weather conditions is a matter of common knowledge, as is the importance thereof to shipping, aviation and land transportation. A principal objective of this invention is the provision of means for making available in suitable locations in simplified visual form capable of quick assimilation at a glance up-to-the-minute weather data as extensive and in such detail as is appropriate to the needs or desires of the intended recipients thereof.

An important advantage of this invention is that practically any number of indicating devices in widely scattered locations can be simultaneously controlled and changed from a single remote source as simply as a single such device can be controlled and changed.

A further advantage of the invention is its adaptability to service as an advertising medium, in any size range, combination of visual elements, illuminated or not, for indoor or outdoor use.

Still a further advantage of the invention is its adaptability to the furnishing of air raid or other disaster warning and the latest important information relating thereto.

Many telephone companies, as a service to the public, make available via telephone the latest hourly report of the United States Weather Bureau's local office, or a suitable summary thereof, to anyone calling or dialing a prescribed number. This is generally accomplished by means of a voice recording arranged to play and repeat automatically upon the making of the phone connection. The recording is revised hourly or periodically as necessary to provide the latest information. A preferred embodiment of the present invention adapted to disseminate weather information sufficient to satisfy general public interest contemplates one or more similar visual indicators placed, for instance, in restaurants, store windows, hotels, stations, ticket offices, roadsides, or other public locations, and connected by conventional telephone dial circuits to the telephone central office having supervision over the aural weather information service above outlined, being adapted to enable change of the said visual indicators by a simple dialing process from such central office each time the voice recording is changed. Any other control point may, of course, be selected, as desired. The visual indicators for this use preferably include a selected number of rotatable cylindrical drums, on the outside surface of which are marked the desired character elements in the desired arrangements, said drums being mounted behind a front panel containing transparent or open windows or areas through which selected portions of the drum surfaces are visible, together with associated control elements and circuits.

A variation of the afore-mentioned visual indicator, controlled in similar manner, may be adapted for home use or service and may incorporate visual and aural alerting or warning means.

How the foregoing and other objectives and advantages as will be made apparent hereinafter are realized will be more fully understood from the following detailed description, referring to the accompanying drawings, wherein.

Figure 1:
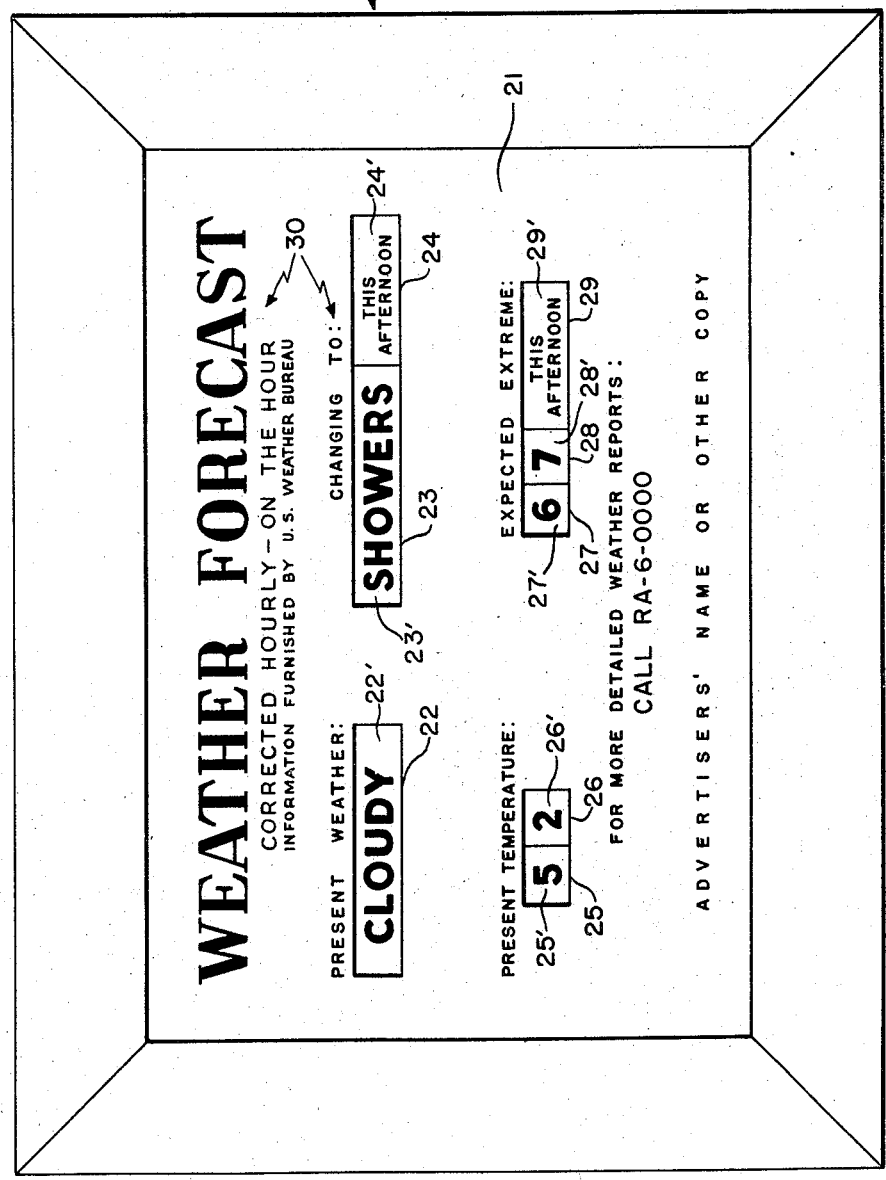
Figure 1 is a front elevation view of a preferred form of visual indicator, showing the front panel and the information indicating windows therein, with illustrative legends and combinations of visual elements.
Figure 2:
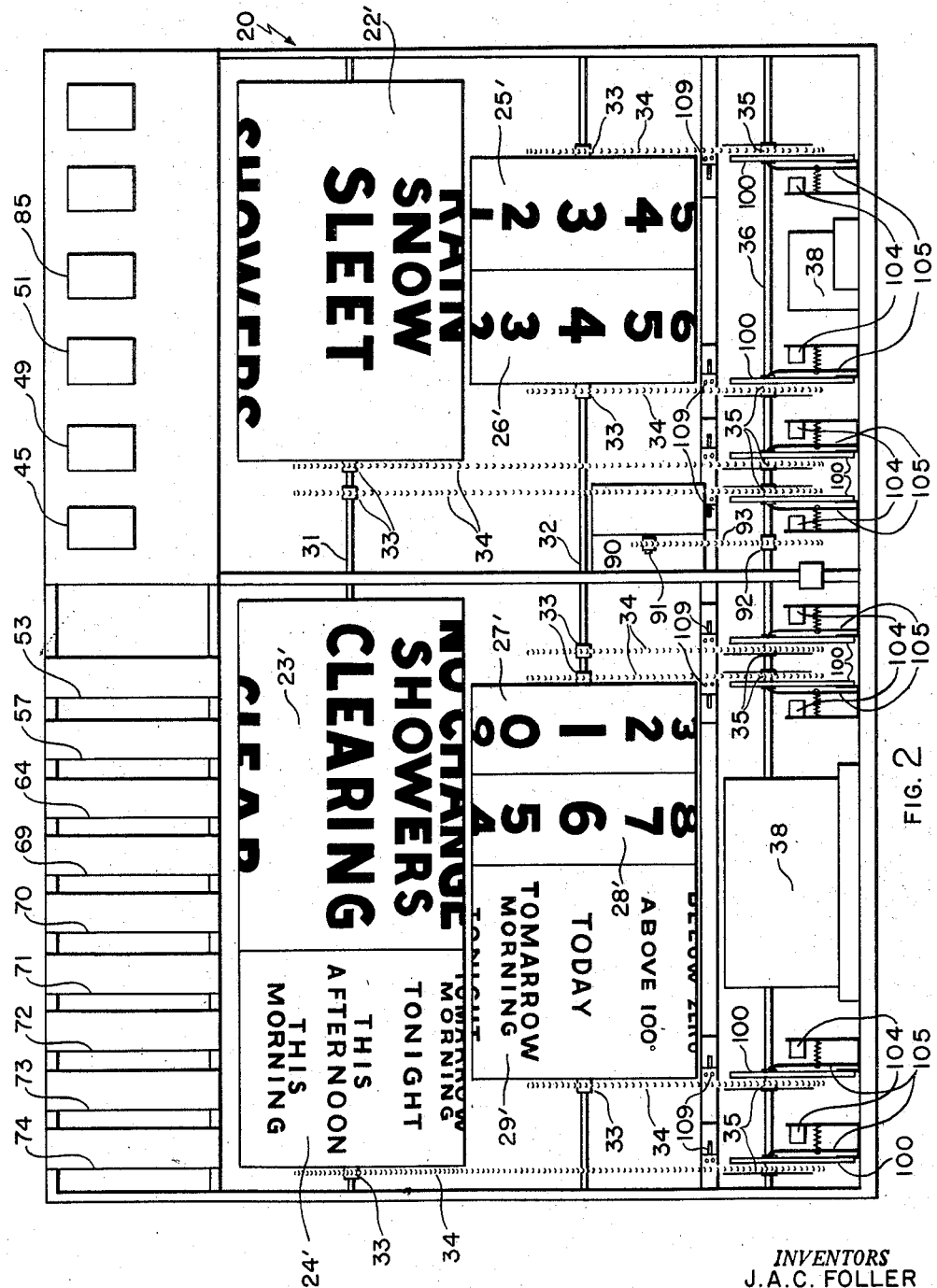
Figure 2 is a rear elevation view of the visual indicator of Figure 1, with the back cover removed, showing the working components of the indicator and their relative arrangement.

One form of visual indicator contemplated by this invention and adapted for the dissemination of weather information sufficient to satisfy the interest of the general public is shown in Figure 1. The indicator so shown comprises a box-like structure 20 having an opaque front panel or display face 21, selected areas of which, in desired shapes and locations, are cut out and left open or provided with transparent coverings to form windows 22, 23, 24, 25, 26, 27, 28 and 29. Suitable legends 30 may be placed upon the display face 21 and adjacent to the windows. Within box 20 are mounted rotatable cylindrical drums 22', 23', 24', 25', 26', 27', 28' and 29', in manner as best shown in Figure 2, being so disposed that upon assembly of the indicator unit the forward facing portions of the surfaces of the drums 22', 23', 24', 25' 26', 27', 28' and 29' are adjacent to, framed by, and visible through windows 22, 23, 24, 25, 26, 27, 28 and 29, respectively. Appropriately situated and inscribed upon the surfaces of the said drums are the desired words, letters, numbers, characters or other indicia to provide in selected combinations the information desired to be conveyed. In the illustrated embodiment, separate portions of the surfaces of drums 22' and 23' are marked Clear, Cloudy, Rain, Snow, Sleet, No Change, Showers, and Clearing; separate portions of the surface of drum 24' are marked This Morning, This Afternoon, Tonight, Tomorrow Morning, and Today; drum 29' has markings similar to those of drum 24' plus Above 100°, and Below Zero; and drums 25', 26', 27' and 28' each are numeral drums, with numbers 1, 2, 3, 4, 5, 6, 7, 8, 9, and 0 thereon. An important feature of the invention, as will be seen hereinafter, is the way in which the number of possible different weather and temperature combinations has been related to the ten available positions of the conventional telephone dial mechanism and related stepper switches, enabling the combination of these elements to produce the desired result.

All of the rotatable drums are individually mounted on either of horizontal shafts 31 and 32, located one below and parallel to the other as shown in Figure 2, so as to be free to revolve about their longitudinal axes independently of one another. Fixedly attached to one end of each drum concentrically with the axial mounting thereof is a circularly shaped sprocket wheel 33. An associated drive chain 34 connects each sprocket wheel 33 to a corresponding circular sprocket wheel 35 mounted on horizontal drive shaft 36, located directly below and parallel to shafts 31 and 32. Sprocket wheels 35 are mounted on drive shaft 36 so as to be free to rotate independently of each other and of the drive shaft itself, each being associated with an individual electromagnet clutch mechanism for coupling to the drive shaft rotation as described below.

Figure 4:
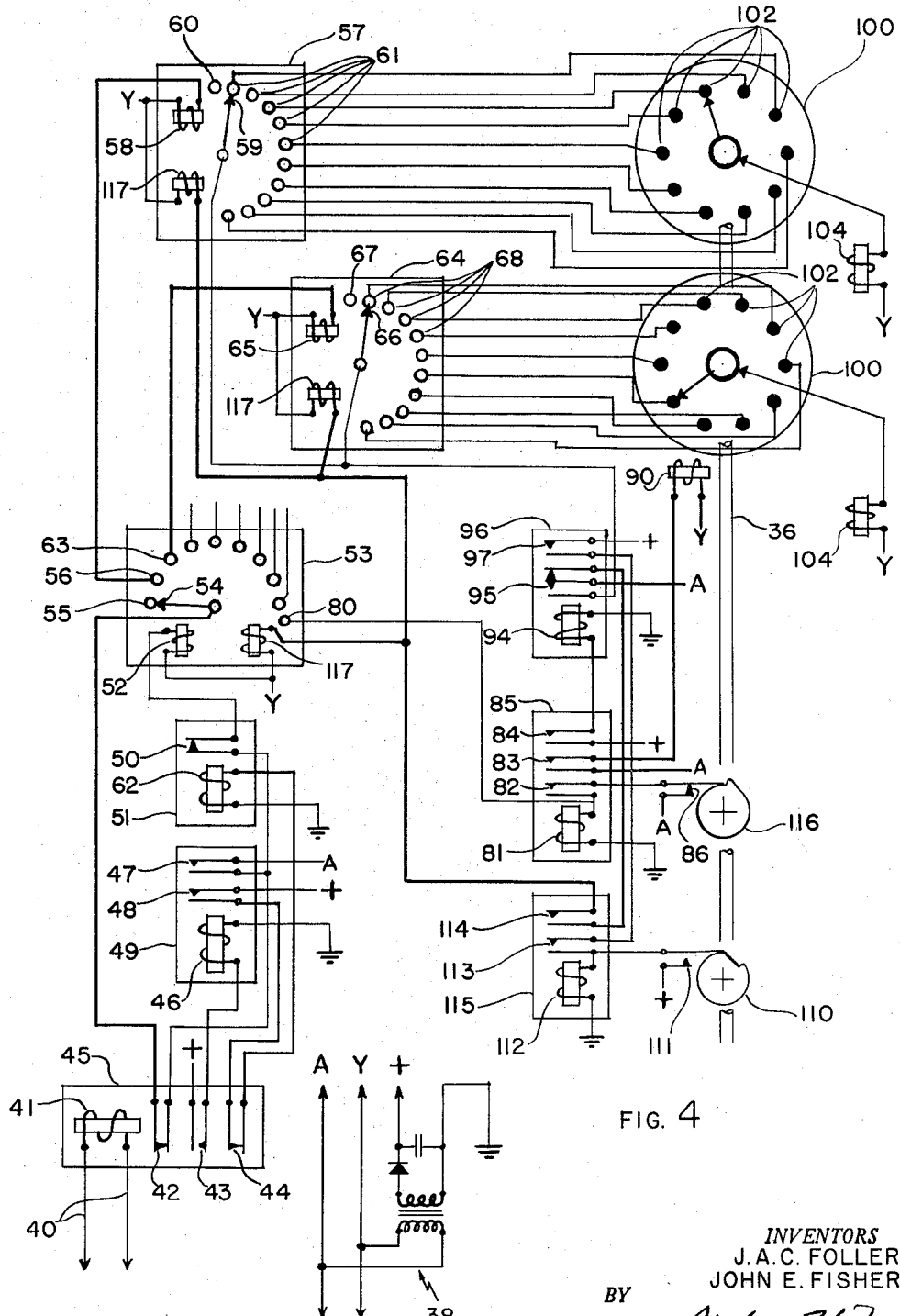
Figure 4 is a diagram showing in schematic form the elements encompassed within the visual indicator, their arrangement and associated circuits.

Figure 4 shows in schematic form the means for controlling the rotation of the drums. Operation of the entire indicator is effected by a remotely located conventional telephone dialing transmitter mechanisms 37, shown in block outline in Figure 5, which is connected to the indicator by standard telephone pair wire 40. When alternating current power is turned on at the transmitter location, relay coil 41 at the indicator is energized, thereby opening contacts 42 and 44, and closing contact 43 in associated combination switch 45. The closing of contact 43 applies direct current energy from local power supply 38 to relay coil 46, which is of a slow release type, well known in the art, thereby closing contacts 47 and 48 in associated combination switch 49. The closing of contact 47 applies alternating current energy from local power supply 38 through closed contact 50 in switch 51 to "set" relay coil 52 in selector switch 53, a ten position rotary stepper switch. Energized coil 52 actuates movable contact 54 to switch position 56 from neutral position 55, thereby connecting into the dialing circuit marker switch 57, which is a ten position rotary stepper switch similar to switch 53, and its associated circuits and mechanism for controlling the rotation of drum 25', to be described below.

The dialing operation begins with selection of the single digit corresponding to the desired position of the particular drum so connected into the dialing circuit, and for this purpose the operator may be furnished with a suitable code. This number is dialed, the corresponding impulses break and make the circuit, successively deenergizing and energizing coil 41 in switch 45, and similarly closing and opening contact 42, in turn causing "set" relay coil 58 to be energized and deenergized, thereby actuating movable contact 59 in marker switch 57 to move from neutral position 60 to the one of switch positions 61 corresponding to the number dialed. Simultaneously with the foregoing action, contact 43 in switch 45 is being successively opened and closed. However, coil 46 is of the slow release type and keeps contacts 47 and 48 closed during the dialing operation, thereby insuring the continued application of alternating and direct current energy as needed. Contact 44 in switch 45, likewise is being successively closed and opened by the dialing impulses. Relay coil 62, also of the slow release type, is thereby energized when the number is dialed, opening contact 50 in switch 51, thereby deenergizing set relay coil 52 in selector switch 53. Coil 62 remains energized until the completion of the impulses from the dialing of a single number until the completion of the impulses therefrom due to its slow release feature. When the dialing impulses cease, contact 44 remains open, since coil 41 remains energized, coil 62 is thereby deenergized, closing contact 50, and again energizing set relay coil 52 in selector switch 53, through contact 47, which remains closed since contact 43, energizing coil 46 is closed. Movable contact 54 in selector switch 53 is thereby actuated to the next switch position 63, thereby successively connecting into the dialing circuit marker switch 64 and its associated circuits and mechanism for controlling the rotation of drum 26', to be described below. Marker switch 64 is similar in type to marker switch 57, and selector switch 54. The appropriate number for the desired position of drum 26' is then dialed, resulting in manner detailed above, through successive energizing and deenergizing of set relay coil 65 in switch 64, in movable contact 66 being actuated to move from neutral position 67 to the one of switch positions 68 corresponding to the number dialed.

The desired positioning of the six remaining marker switches 69, 70, 71, 72, 73 and 74, not shown in Figure 4, but indicated simply in block outline in Figure 2, is successively accomplished by the dialing of the appropriate code numbers corresponding to the desired positioning of the respective drums, all in the manner shown above, through successive positionings of selector switch 53, as indicated. Of course the complete dialing of all eight numbers in the process can be accomplished without pause or delay, since the aforesaid functioning of the elements is so rapid as to be practically instantaneous.

After the last marker switch 74 is so positioned, movable contact 54 of selector switch 53 is actuated to the last switch position 80, in the manner shown. The alternating current power is then turned off at the transmitter location, thereby deenergizing coil 41 in switch 45, closing contacts 42 and 44, and opening contact 43. Due to the slow release action of coil 46, however, contact 47 remains closed long enough to energize relay coil 81, through closed contact 42 and movable contact 54. The energizing of coil 81 results in the closing of contacts 82, 83 and 84 in associated combination switch 85. After slow release coil 46 is deenergized, thereby opening contact 47, coil 81 remains energized due to the locking-in action of closed contacts 86 and 82. The closing of contact 83 starts electric motor 90 which functions to turn drive shaft 36 through associated sprocket wheels 91 and 92 and drive chain 93. At the same time, the closing of contact 84 energizes relay coil 94 which in turn switches contact 95 in combination switch 96 to position which applies alternating current power to all marker switch movable contacts 59, 66, etc. Contact 97 in switch 96 is also closed by the energizing of coil 94.

Figure 3:
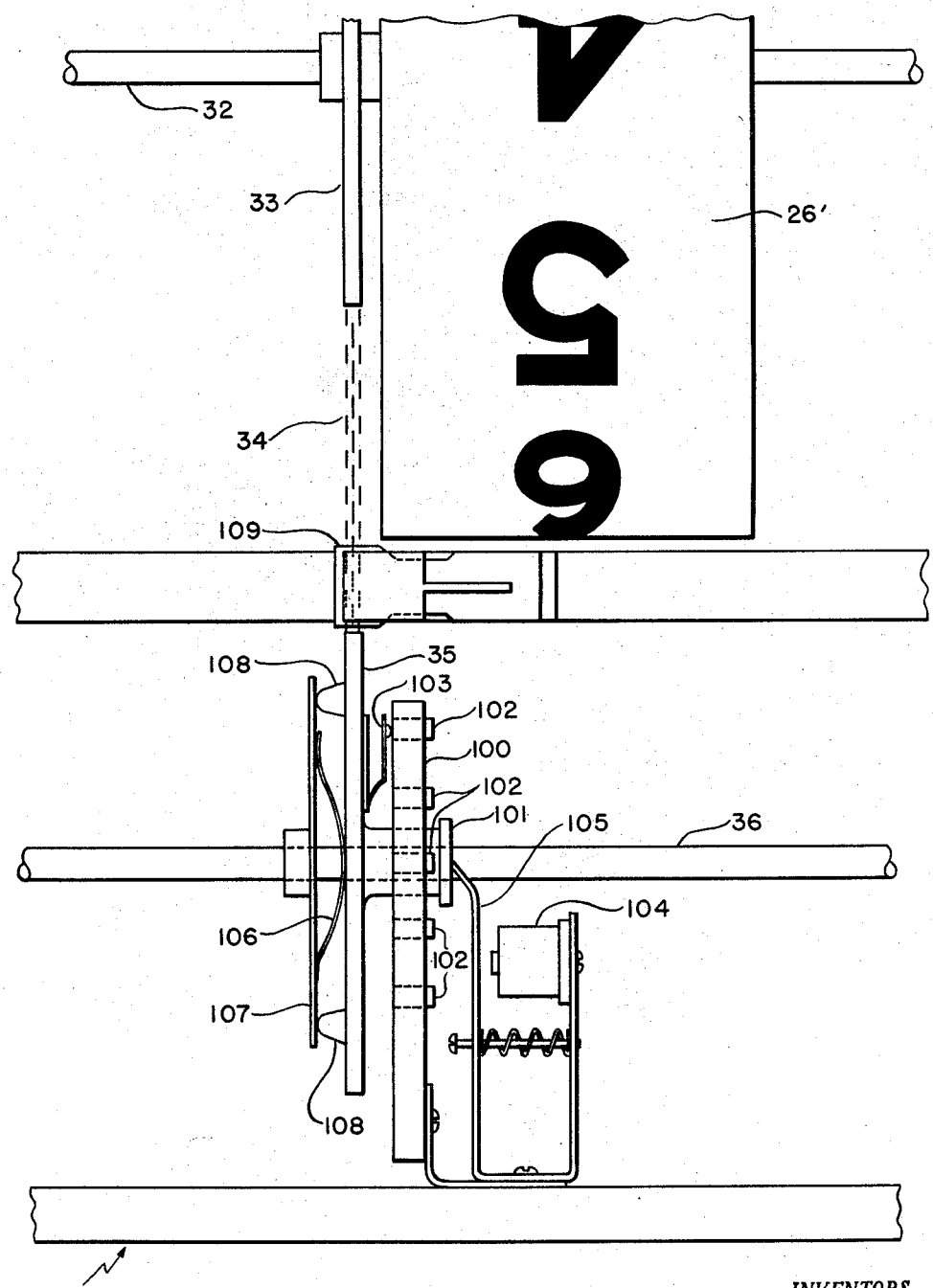
Figure 3 is an enlarged detail view of the drive, clutch and brake mechanism used for effecting rotation of the indicating drums to desired positions.

For each marker switch and rotatable drum there is a corresponding circular shaped disc 100, best shown in Figure 3, made of insulating material such as Bakelite, fixedly mounted to structure 20 perpendicularly of drive shaft 36, being so positioned, with its center cut away, to receive the drive shaft and hub 101 of associated sprocket wheel 35 therethrough. Near the perimeter of and so spaced around disc 100 as to correspond to the separate spacings of the legends on the surface of the particular rotatable drum associated therewith are ten electrical contacts 102, each of which is respectively connected electrically to a successive position 61, or 68, etc., of the related marker switch 57, or 64, etc. Fixed to each sprocket wheel 35 is electrical spring contact 103, so positioned as to rotate with the sprocket wheel and make successive wiper electrical contact with contacts 102 in fixed disc 100. Each wiper spring contact 103 is connected electrically to the coil 104 of an associated electromagnet, which controls the position of armature leaf spring 105. When coil 104 is not energized, spring 105 bears against the hub 101 of sprocket wheel 35, forcing it against the resistance of spring 106 into contact with flange 107 fixedly attached to drive shaft 36. Friction contact maintained between all sprocket wheels 35 and their respective flanges 107, with the aid of rubber cushions or buttons 108 spaced around the surface of the sprocket wheels, causes all sprocket wheels and their corresponding rotatable drums to be positively driven by the drive shaft when motor 90 is started as heretofore described. As each sprocket wheel 35 is so driven and turns its respective drum, spring contact 103 passes over contacts 102 in fixed disc 100 until it hits the particular contact which corresponds to the position of its respective marker switch and is energized through switches 85 and 96 as previously explained. Such energized contact being positioned to correspond with the desired position of the drum, electromagnet coil 104 is immediately energized through wiper contact 103, moving spring 105 out of contact with sprocket wheel hub 101, sprocket wheel 35 being immediately declutched from flange 107 by the action of spring 106. Any tendency of sprocket wheel 35 and its associated drum to creep or drift thereafter may be stopped by friction brake 109, which may be connected electrically to operate at the same time electromagnetic coil 104 is energized, or may be a continuous drag brake, as desired.

Each of the rotatable drums successively assumes its desired position in manner aforesaid, as motor 90 continues to turn drive shaft 36. After substantially a full revolution of drive shaft 36, all drums have been so positioned, and cam 110 on drive shaft 36, rotating clockwise in Figure 4, then operates to momentarily close direct current power switch 111, thereby energizing relay coil 112 which in turn closes contact 113 and contact 114 in combination switch 115. The closing of contact 113 results in the locking-in of coil 112 so that it continues to be energized through closed contact 97 in switch 96 after the rotation of cam 110 again opens switch 111. Next in sequence, cam 116 on drive shaft 36 then operates momentarily to open switch 86, thereby unlocking and deenergizing coil 81 in switch 85, which operates instantaneously to open contacts 82, 83 and 84, shutting off motor 90, and denergizing coil 94 in switch 96. Contact 95 thereby shifts its position to deenergize all marker switches and to energize reset coils 117 in the selector switch 53 and in all marker switches, thereby releasing the respective movable contacts and allowing them to return to their neutral positions. When coil 94 is denergized, switch 97 is also opened, which deenergizes coil 112 in switch 115, but due to the slow release action of coil 112, contact 114 remains closed long enough to energize the reset coils as aforesaid. As contact 114 then opens, the sequence of operation is completed, and the system is ready for the next full positioning operation when desired.

A monitoring indicator may be located at the dialing station as a check for the operator on the accuracy of a dialing sequence and the proper drum positioning. Such a monitor, not shown in the drawings, may be essentially the same as the indicator unit described above in miniature, or may be simplified by eliminating the resetting elements and substituting manual resetting, etc., as desired.

Figure 5:
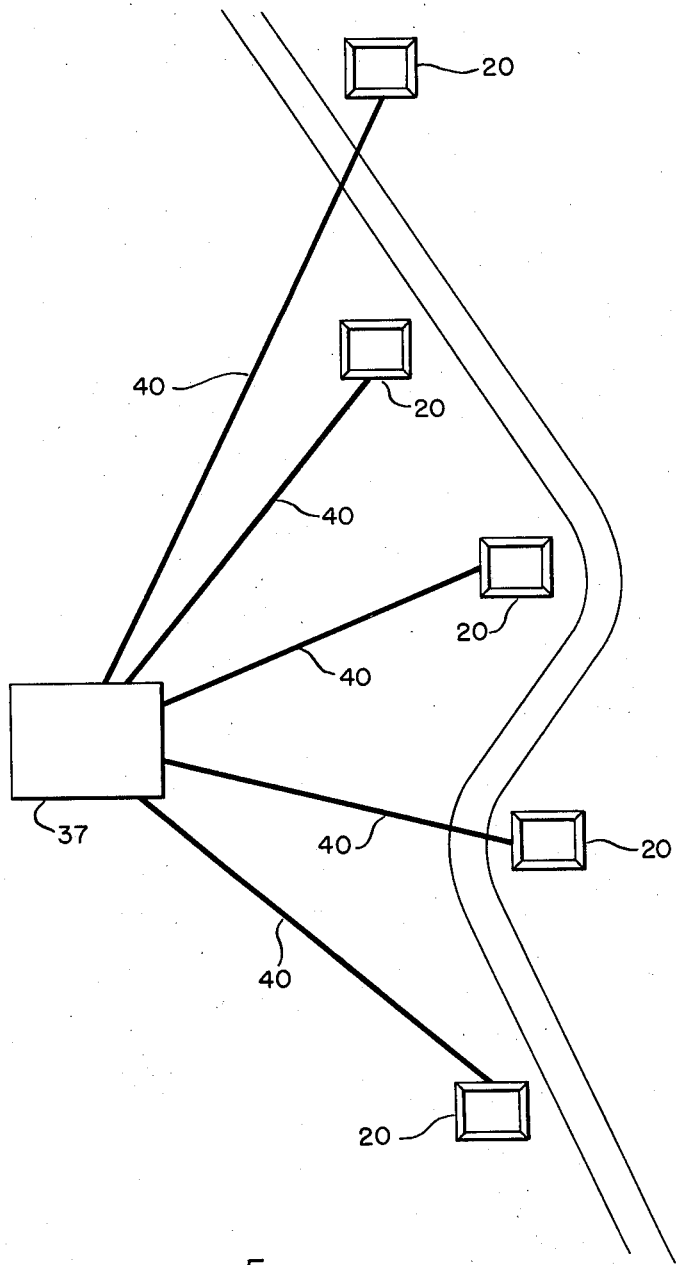
Figure 5 is a block diagram representative of a typical information dissemination system comprising a plurality of visual indicators of the type illustrated in the preceding figures and a single remote control station, for use in highway travel.

Figure 5 shows in block outline the manner in which a plurality of indicators 20, widely scattered in location, along a highway or turnpike for instance, may be connected to and controlled simultaneously from a single remotely situated dialing transmitter 37 by the dialing operation outlined above. Booster equipment may be added as needed, depending upon distances between transmitter and indicator locations, number of indicators operated from a single transmitter, etc.

It is apparent from the foregoing that the system and the units within the system are adaptable to a wide variety of uses requiring visual informational or intelligence display, whether of a public service, advertising, traffic regulating, or other nature, and all such adaptations and uses are within the scope of this invention. Likewise the system is, with the addition of equipment well known in the art adaptable to control by means of electromagnetic impulses propagated through the ether, without the aid of wire connection between transmitter and indicator. Again, varying means of providing impulses can be substituted for the dialing means without departing from the spirit of the invention. The invention is of course not restricted to the particular embodiments herein shown and described. Many modifications and variations, adaptations and uses thereof will occur to those skilled in the art, and it must be understood that all such modifications, etc., are equally within the contemplation and scope of the invention and the appended claims.

Having thus described our invention, we claim:

1. A visual intelligence dissemination system including a control transmitter having an electric power supply, a power switch, and a break-and-make circuit control comprising a finger dial mechanism and associated circuit, and at least one indicator unit located at a distance therefrom and having a plurality of cylindrical drums mounted so as to be rotatable about their longitudinal axes and bearing selected indicia at spaced intervals upon their external surfaces, and electric power supply, a marker circuit for each of said drums comprising a circularly shaped fixedly positioned insulated disc bearing about its periphery a plurality of electrical contacts equal in number to the number of selected indicia upon the surface of the drum and spaced to correspond with the spacing thereof upon the drum and a multiple position electromagnetic marker switch a different position of which is connected to each of the electrical contacts of said insulated disc, electromagnetic switching means and associated circuits responsive to the application of power at the transmitter and to impulses and the completion thereof resulting from the sequential dialing of a number of selected single numbers equal to the number of drums and severally corresponding to the several desired positionings thereof actuating in sequence each marker switch to connect its movable contact to the electrical contact on the insulated disc corresponding to the desired position of its associated drum and the energizing of all such connected electrical contacts through their respective marker switch movable contacts, driving, clutching and braking means for differentially positioning each drum to correspond with the position of the energized electrical contact and means for resetting all switches and de-energizing all circuits responsive to the cutting off of electric power at the transmitter.

2. A visual intelligence dissemination system including a transmitter having means for manually and sequentially selecting a plurality of numbers of electromagnetic impulses and automatically transmitting separately each of said plurality of numbers in desired sequence, and at least one indicator unit located at a distance from the transmitter, said indicator unit including a plurality of movable elements having outwardly facing surfaces bearing desired visual indicia in desired arrangements, said elements being so disposed that only selected portions of such surfaces are visible from the viewer's position at any selected time, separate position marker means associated with each of said movable elements and including a multiple position marker switch responsive to the transmission of one of the said plurality of numbers of electromagnetic impulses and a stationary insulated disc bearing a plurality of electrical contacts spaced to correspond with the spacings of visual indicia arrangements on its associated movable element, each of which contacts is connected to a different position of said marker switch, a multiple position selector switch responsive to the completion of the transmission of each of the said plurality of numbers of electromagnetic impulses successive positions of which are connected to successive marker switches, means for energizing through respective marker switch movable contacts the respective disc contacts corresponding to the settings of said marker switches, and means for selectively positioning each movable element responsive to and corresponding with the position of the energized contact on its associated disc.

3. In an indicator unit for a visual intelligence dissemination system adapted for control from a remotely located point, a plurality of rotatable drums bearing on their external surfaces desired visual indicia in desired arrangements, said drums being so disposed that only selected portions of their surfaces are visible from the viewer's position at any selected time, separate position marker means associated with each of said drums and including a multiple position marker switch responsive to the transmission of a selected number of electromagnetic impulses and a stationary insulated disc bearing a plurality of electrical contacts spaced to correspond with the spacings of visual indicia arrangements on its associated drum, each of which contacts is connected to a different position of said marker switch, and a multiple position selector switch responsive to the application of power at the remotely located control point and to the completion of the transmission of each selected number of electromagnetic impulses, successive marker switches being connected to successive positions of said selector switch, whereby application of power and the sequential transmission of selected numbers of impulses from the control point will accomplish the tying in to the respective marker switch movable contacts of the particular disc contacts corresponding positionwise to the desired positions of the several drums.

4. In the indicator unit of claim 3 all marker switch movable contacts being connected into a common energizing circuit, a power supply, and switching means responsive to the cutting off of power at the control point connecting said power supply into said common energizing circuit so as to simultaneously energize the several disc contacts tied in to their respective marker switch movable contacts.

5. In the indicator unit of claim 4 a rotatable drive shaft and an electric motor connected thereto, switching means responsive to the cutting off of power at the control point connecting said power supply to said motor so as to start rotation of said drive shaft at substantially the same time the several disc contacts are energized.

6. In the indicator unit of claim 5 declutchable means coupling each drum to the drive shaft independently of each other drum and an electrical spring contact mounted in fixed positional relationship to the drum so as to make successive wiping connection with the successive electrical contacts on its associated stationary disc as the said drum is rotated by the shaft, and electromagnetic means for declutching the several drum coupling means as their several spring contacts mate with the energized contacts on their several stationary discs.

7. In the indicator unit of claim 5, the selector switch and each marker switch having reset relay coils all connected into a common reset circuit, cam means assembled to the drive shaft and associated switching means operated thereby when the drive shaft has made approximately a full revolution to deenergize the motor and the stationary disc contacts and to energize the reset relay coils thereby resetting all associated switches and finally deenergizing said coils.

8. In an indictor for a visual intelligence dissemination system adapted for control from a remotely located point, at least one movable element having an outwardly facing surface bearing desired visual indicia in desired arrangements and being so disposed that only a selected portion of said surface is visible from the viewer's position at any selected time, an associated multiple position electromagnetic marker switch having a set relay coil and an associated movable contact responsive to the transmission from the control point of a selected number of electromagnetic impulses and having at least as many separate positions as the number of separate arrangements of visual indicia on said movable element, and an associated fixedly positioned insulated disc bearing a plurality of electrical contacts positionally spaced to correspond with the spacings of visual indicia arrangements on said movable element, each of which contacts is connected to a separate position of said marker switch, whereby transmission of a selected number of impulses from the control point will accomplish the tying in to the marker switch movable contact of the particular disc contact corresponding positionwise to the desired position of the movable element.

9. Driving and positioning mechanism for a plurality of rotatable indicating elements in an indicator unit, said indicating elements bearing on their external surfaces desired visual markings separately spaced thereabout in desired arrangements, comprising a common drive shaft and a motor coupled thereto, a stationary disc of insulating material associated with each indicating element and bearing in a circular path thereabout a plurality of electrical contacts corresponding in number and spacing to the number and spacing of the visual markings on such indicating element, said drive shaft being concentrically mounted through said disc so as to be free to rotate therethrough, declutchable means coupling each indicating element to the drive shaft and an electrical spring contact fixedly attached to declutchable coupling means so as to maintain fixed positional relationship to the corresponding indicating element and so as to make successive mating connection with the successive electrical contacts on said disc as the said declutchable coupling means is driven by the drive shaft, an electromagnet electrically connected to said electrical spring contact so fixedly attached to said declutchable coupling means so as to be energized therethrough when said electrical spring contact mates with an energized electrical contact on the disc, means operated by the electromagnet for declutching the indicating element coupling means from the drive shaft upon energizing of the electromagnet, and means for energizing any selected one of the electrical contacts on said disc and for operating the motor.

References Cited in the file of this patent

UNITED STATES PATENTS

| | | |
|---|---|---|
| 1,055,929 | Long | Mar. 11, 1913 |
| 1,306,593 | Hall | June 10, 1919 |
| 1,414,686 | Blessing | May 2, 1922 |
| 1,466,448 | Katz | Aug. 28, 1923 |
| 1,498,544 | Fowler | June 24, 1924 |
| 2,190,543 | Ivie | Feb. 13, 1940 |
| 2,455,209 | Anderson | Nov. 30, 1948 |
| 2,455,210 | Anderson | Nov. 30, 1948 |
| 2,456,226 | Thorpe | Dec. 14, 1948 |
| 2,471,150 | Goodale | May 24, 1949 |
| 2,727,222 | Bush | Dec. 13, 1955 |